(12) United States Patent
Lowenstein

(10) Patent No.: US 7,092,229 B1
(45) Date of Patent: *Aug. 15, 2006

(54) ELECTRICAL FILTER/PROTECTOR, AND METHODS OF CONSTRUCTING AND UTILIZING SAME

(75) Inventor: Michael Z. Lowenstein, Mequon, WI (US)

(73) Assignee: Harmonics Limited, Inc., Monroe, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 663 days.

(21) Appl. No.: 08/422,360

(22) Filed: Apr. 17, 1995

Related U.S. Application Data

(63) Continuation-in-part of application No. 08/130,088, filed on Sep. 30, 1993, now abandoned.

(51) Int. Cl.
*H02H 1/00* (2006.01)

(52) U.S. Cl. .................... 361/113; 361/15; 361/111; 307/105

(58) Field of Classification Search ............... 361/113, 361/111, 15; 363/44; 307/401, 105
See application file for complete search history.

(56) References Cited

U.S. PATENT DOCUMENTS

| | | | | |
|---|---|---|---|---|
| 3,849,677 A | * | 11/1974 | Stacey et al. ............... | 307/520 |
| 3,859,542 A | | 1/1975 | Kennedy ................... | 307/88 R |
| 3,881,137 A | * | 4/1975 | Thanawala .................. | 361/113 |
| RE29,080 E | | 12/1976 | Kiko ........................ | 333/24 R |
| 4,176,310 A | | 11/1979 | Elenga ......................... | 323/7 |
| 4,812,669 A | | 3/1989 | Takeda ....................... | 307/105 |
| 4,819,125 A | | 4/1989 | Arinobu ....................... | 361/97 |
| 4,833,344 A | | 5/1989 | Moon ...................... | 307/296.6 |
| 4,922,364 A | | 5/1990 | Paulson ....................... | 361/16 |
| 4,939,486 A | | 7/1990 | Bergdhal et al. ............ | 333/175 |
| 4,961,044 A | | 10/1990 | Kravitz ....................... | 323/205 |
| 5,243,648 A | * | 9/1993 | Gilardi et al. .............. | 361/111 |
| 5,880,719 A | * | 3/1999 | Kininis ....................... | 345/212 |

* cited by examiner

*Primary Examiner*—Kim Huynh
(74) *Attorney, Agent, or Firm*—Irving M. Weiner; Pamela S. Burt; Weiner & Burt, P.C.

(57) ABSTRACT

A device for an electrical power system having a nonlinear load. The circuit is connected in series with the nonlinear load and is tuned to the third harmonic of the power source frequency. The circuit substantially eliminates the harmonic currents and neutral currents located in the power system, and improves the power factor of the nonlinear load by optimizing the current drawn by the nonlinear load.

5 Claims, 9 Drawing Sheets

| HARMONIC | no filter | filter | no filter | filter | no filter | filter | no filter | filter |
|---|---|---|---|---|---|---|---|---|
| PHASE | A | | B | | C | | NEUTRAL | |
| 1 | 100 | 100 | 100 | 100 | 100 | 100 | 100 | 100 |
| 3 | 91.2 | 10.3 | 89.2 | 18 | 92.9 | 12.3 | 736.7 | 114.3 |
| 5 | 75.4 | 29.3 | 75.7 | 25.6 | 78.6 | 31.5 | 107.1 | 32.1 |
| 7 | 56.1 | 13.8 | 56.8 | 20.5 | 58.9 | 14 | 39.3 | 14.3 |
| 9 | 38.6 | 13.8 | 37.9 | 12.8 | 41.1 | 15.8 | 310.7 | 125 |
| 11 | 21 | 6.9 | 18.9 | 7.7 | 23.2 | 8.8 | 39.3 | 17.8 |
| 13 | 7 | 6.9 | 8.1 | 7.7 | 8.9 | 10.5 | 3.6 | 17.8 |
| 15 | 3.5 | 8.6 | 2.7 | 2.6 | 3.6 | 8.7 | 25 | 64.3 |
| 17 | 5.3 | 10.3 | 5.4 | 7.7 | 5.4 | 10.5 | 10.7 | 3.6 |
| 19 | 5.3 | 12 | 5.4 | 7.7 | 5.4 | 12.3 | 7.1 | 32 |
| RMS AMPS | 1.94 | 1.26 | 1.25 | 0.85 | 1.97 | 1.26 | 3.06 | 0.8 |

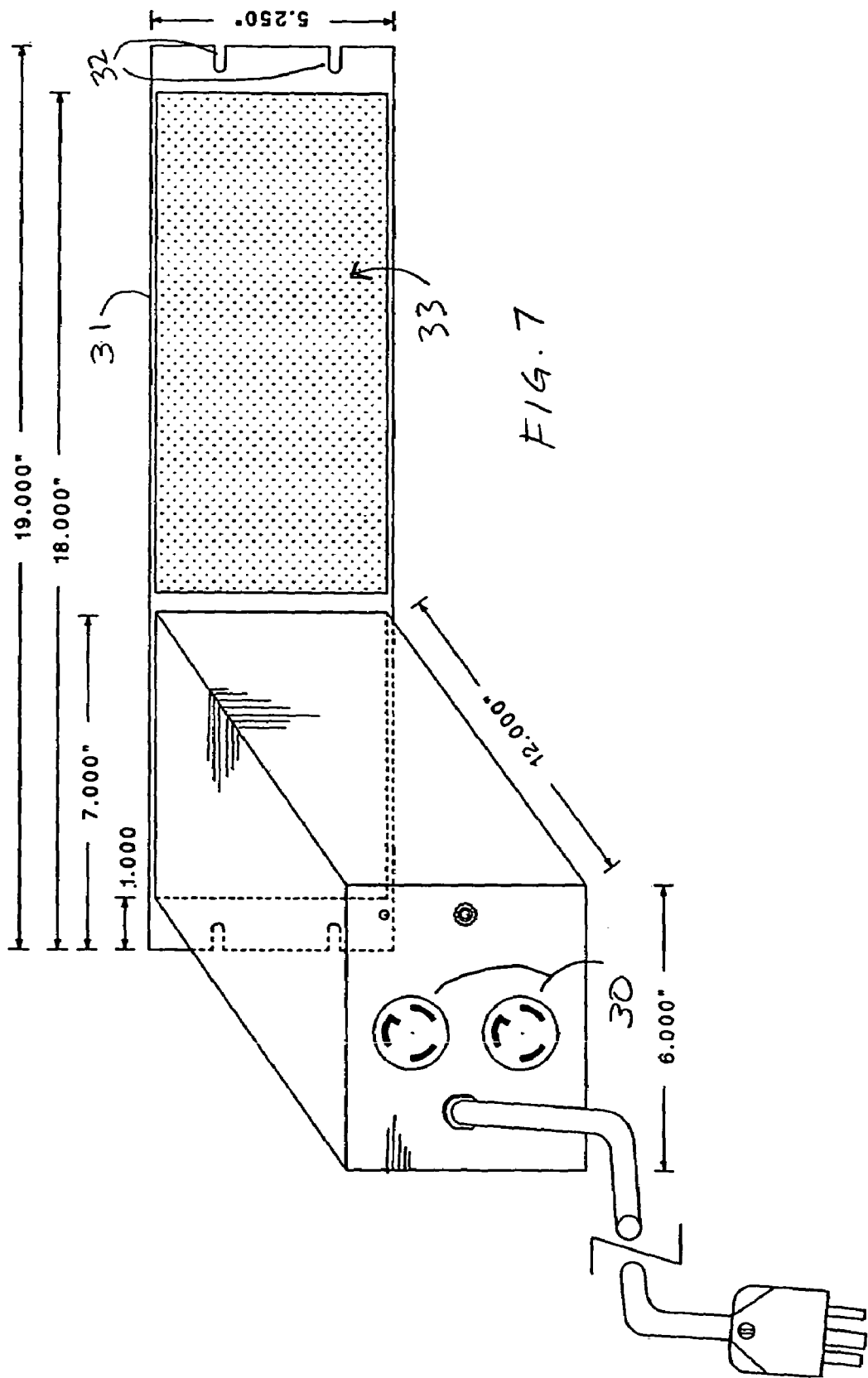

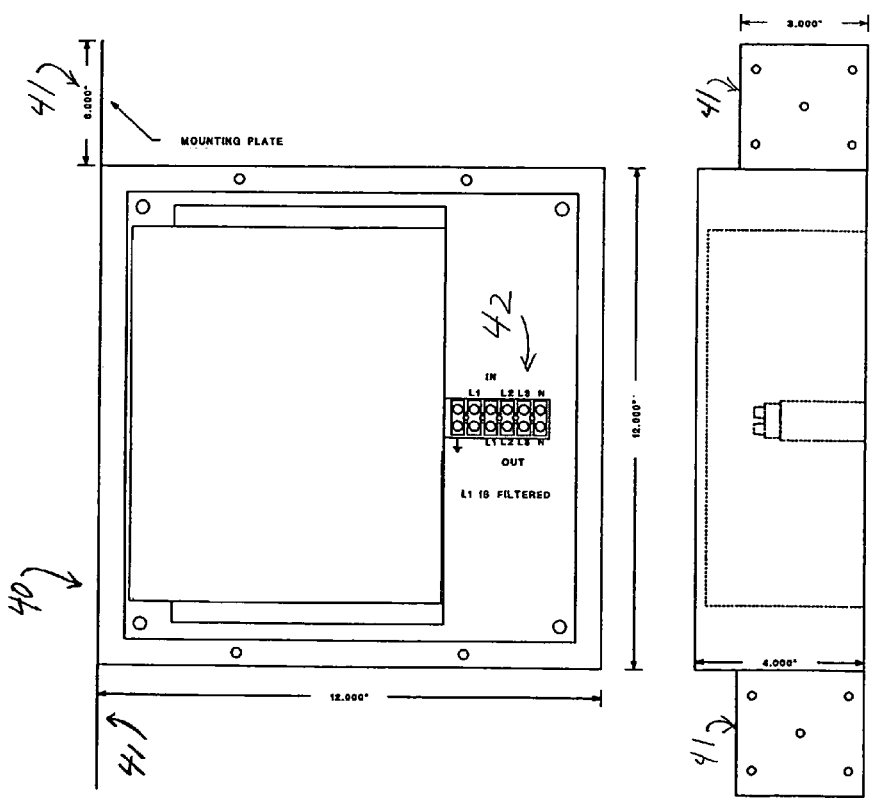

ELECTRICAL FILTER/PROTECTOR, AND METHODS OF CONSTRUCTING AND UTILIZING SAME

This application is a continuation-in-part application of application U.S. Ser. No. 08/130,088, filed Sep. 30, 1993 now abandoned.

BACKGROUND OF THE INVENTION

1. Field of Invention

This invention relates to a device for optimizing the operation of a nonlinear load, and particularly to a device for improving the power factor in an electrical power system and substantially eliminating harmonic currents generated by the nonlinear loads.

In electrical power systems, harmonic currents are often created due to the presence of nonlinear loads located therein. In some instances, significant levels of third order harmonic currents are created in electrical power systems having single phase nonlinear loads, which may often approach the level of the fundamental frequency current. Such third order harmonic currents adversely effect the performance of power systems by causing the peak voltage of the power lines to flatten, thus disrupting the operation of nonlinear loads, such as single-phase switching power supplies, and corresponding devices connected thereto.

Further, because harmonic currents in electrical power systems are additive in the neutral line, the harmonic currents in each phase line can greatly increase the amount of current in the neutral line, despite an even load distribution among the three phases in the power system. Such increases in the neutral current can result in voltage differences between the neutral and safety ground. In computer networks, for example, as these voltage levels approach the computer network signal levels, interference and data loss can result. Further, significant neutral current increases can cause the neutral lines and circuit breakers to be overloaded and overheated, which may possibly result in fires. Therefore, it is highly desirable to substantially eliminate harmonic currents in an electrical power system.

2. Description of Relevant Art

There are known inventions that improve the power factor of power systems or suppress harmonic currents generated therein. For example, U.S. Pat. No. 3,859,542 discloses compensation shunt circuitry for reducing harmonic currents when using nonlinear devices in power systems. However, by including capacitive reactive compensation in parallel to the devices, the invention includes an inherent overcorrection of the power factor.

Further, U.S. Pat. No. 4,961,044 discloses circuitry for improving the power factor of power supplies. This invention, though, fails to disclose a device adapted to be connected in series with a power supply, or a device for reducing neutral currents.

Additionally, U.S. Pat. No. 4,939,486 discloses a double-tuned shunt filter tuned to ordinal numbers 11 and 13 of the supply signal, and a high-pass filter in parallel therewith, both of which are adapted to reduce temperature variations thereof. This invention, however, fails to provide circuitry in series with a nonlinear load for reducing harmonic currents generated by the third harmonic, or for reducing neutral currents in an electrical power system.

Further, U.S. Pat. No. 4,812,669 discloses a device for suppressing harmonic currents using a passive filter tuned to high-order harmonic frequencies and an active filter tuned to low-order harmonic frequencies. However, the invention fails to provide a simply constructed, low power device for reducing neutral currents or third harmonic currents.

SUMMARY OF THE INVENTION

The present invention overcomes the above-discussed limitations and shortcomings and thereby satisfies a significant need for a device in an electrical power system which is simple in construction, uses no active electronic or otherwise expensive components, consumes little power, and significantly eliminates the adverse effects that nonlinear loads cause therein. The present invention may suitably comprise a passive tank circuit connected in series with the nonlinear load and tuned to the third harmonic so as to substantially optimize the current draw by the nonlinear load.

It is an object of the present invention to provide a circuit for substantially eliminating the harmonic currents drawn by nonlinear loads in a three phase electrical power system.

Another object of the present invention is to provide a circuit to improve the power factor in an electrical power system.

Still another object of the invention is to provide a circuit to substantially eliminate the neutral currents in an electrical power system.

It is additionally an object of the present invention to provide such a device which consumes negligible power, is inexpensive and contains no active electronic components.

Another object of the present invention is to provide a portable device for simple and quick connection to any electrical power system.

An additional object of the present invention is to provide a circuit design which is easily applicable to a variety of power system applications.

Other objects, advantages and salient features of the present invention will become apparent from the following detailed description, which, when taken in conjunction with the annexed drawings, discloses a preferred embodiment of the present invention.

BRIEF DESCRIPTION OF THE DRAWINGS

FIG. 7 is a perspective view of a preferred embodiment of the present invention configured to mount to an equipment rack.

FIG. 8 is a top plan view of a preferred embodiment of the present invention configured as a wall mounted electrical box.

FIG. 9 is a rear elevational view of FIG. 8.

DETAILED DESCRIPTION OF THE PREFERRED EMBODIMENTS

Figure 1:
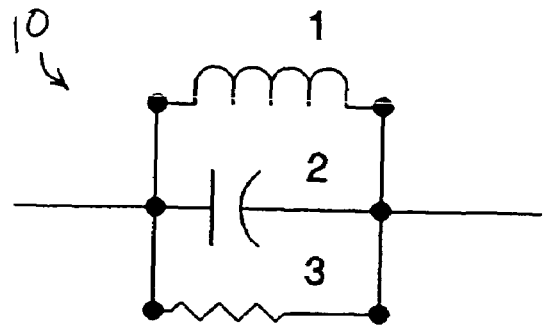
FIG. 1 is a schematic diagram of a filter device in accordance with the present invention.

Referring to FIG. 1, there is shown a circuit schematic of a device according to the present invention. Specifically, the circuitry preferably comprises reactor 1, capacitor 2, and resistor 3 connected in parallel, and is tuned to the third harmonic of the AC power source frequency. Such circuitry is preferably connected in series with a nonlinear load 8 (FIGS. 2 and 3) and between the load and high voltage AC source 4 along each phase line in the electrical power system.

Figure 4:
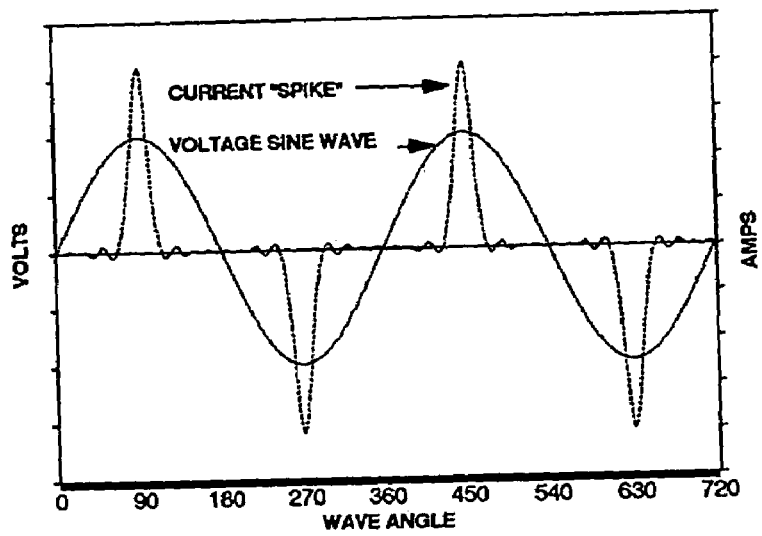
FIG. 4 is a graph showing a typical current drawn by a nonlinear load.

Nonlinear loads receive that name because they draw current from the source which is not of the same waveform as the voltage. Specifically, FIG. 4 illustrates the voltage and current drawn by a nonlinear load, such as a PC computer. The voltage curve is sinusoidal, with a fundamental frequency of 60 Hz in many instances, and the current is drawn by the load in spikes as shown. This type of current waveform, which is nonsinusoidal, is caused by the nonlinear load and is typical of all nonlinear loads.

In 1870 Fourier showed mathematically that any nonsinusoidal waveform could be produced by the proper combination of sinusoidal waves which are harmonics (integral multiples) of the fundamental frequency. The currents drawn by nonlinear loads provide a real-world example of how harmonics can be combined to produce nonsinusoidal waveforms. Since the AC source can provide only sinusoidal currents, the nonsinusoidal current demanded by the nonlinear load is provided by supplying the proper sinusoidal harmonic currents to make up the demanded waveform.

Modern measuring instruments can analyze the waveform of a nonsinusoidal current, for example the current shown in FIG. 4, and determine the values of each of the harmonic frequencies which make up that current. The current waveform shown in FIG. 4 is typical of currents drawn by nonlinear loads and is substantially comprised of current at the fundamental frequency and the following harmonic currents, shown as percentages of the fundamental current: third harmonic (91.2% of fundamental); fifth harmonic (75.4%); seventh harmonic (56.1%); ninth harmonic (36.6%); 11th harmonic (21%); and under 10% of the fundamental frequency for each of the higher frequency odd harmonics. While the actual magnitude of each harmonic may vary slightly from load to load, these harmonics are representative of typical single-phase nonlinear loads.

In a typical Wye-connected electrical power system, three phase wires and a neutral wire are provided. Single-phase nonlinear loads are connected between each phase line and neutral. Vector analysis of the fundamental currents shows that, when the fundamental currents in all three phase lines are of equal magnitude, the neutral line carries substantially no current. The neutral carries only the imbalance fundamental current when the loads on the three phases are not equal. However, when harmonic currents are being drawn by the loads, certain harmonic currents, especially the third and multiples thereof (9th, 15th, etc.) do not cancel in the neutral line but are instead additive. Thus a Wye-connected electrical system having a third harmonic current of one amp in each of the three phase lines could have a third harmonic current of three amps flowing in the neutral line.

Referring to FIG. 1, there is shown a circuit diagram of a device according to the present invention. Specifically, the circuitry preferably comprises a reactor 1, capacitor 2, and resistor 3 all connected in parallel. The series impedance of such circuitry is substantially infinite to sine waves at the tuned frequency. In the preferred embodiment of the present invention, the tuned frequency is the third harmonic of a 60 Hz signal fundamental, or 180 Hz. Alternatively, the device may be tuned at other frequencies for power distribution systems having different fundamental frequencies, or for different harmonics of the 60 Hz fundamental frequency. The high impedance at this tuned frequency, when connected in series with a nonlinear load, substantially prevents the nonlinear load from drawing third harmonic currents. Thus the load is forced to change the way in which it draws current in order to compensate for the suppression of third harmonic currents.

Figure 5:
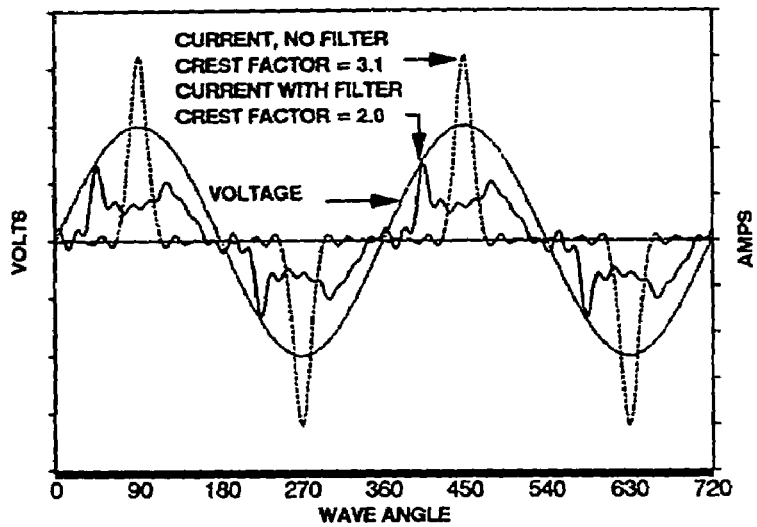
FIG. 5 is a graph showing a typical current drawn by a nonlinear load upon connection to the present invention.

The resulting changed current waveform drawn by a nonlinear load connected in series with the device is shown in FIG. 5. Instead of drawing its current in a sharp spike thereby limiting the number of loads that can be powered by the source, nonlinear load(s) connected in series with the present invention draw current with a lower peak and a broader waveform. Such drawn current waveform more closely resembles a sinusoidal current than the current waveform drawn by the nonlinear load without the invention connected in series. The altered waveform does not noticeably affect the performance of a nonlinear load, such as a personal computer.

The resulting current waveform representing current drawn by a nonlinear load connected in series with the present invention (FIG. 5) is substantially comprised of a fundamental current component and the following harmonic currents shown as percentages of the fundamental current: third harmonic (10.3% of the fundamental): fifth harmonic (29.3%): seventh harmonic (13.8%): ninth harmonic (13.8%): 11th harmonic (6.9%): and for each higher odd numbered harmonic, less than 10% of the fundamental. Thus by altering the way in which the nonlinear loads draw current in an electrical power system, the present invention, being tuned to the third harmonic, reduces not only the third harmonic current but other harmonic currents as well, even though it is not specifically tuned to those other harmonic frequencies.

As seen in FIG. 5 is the reduction of peak current drawn by the nonlinear load connected in series with the present invention. The crest factor (the ratio of peak current to RMS current) for the nonlinear load shown is reduced from 3.1:1 to 2.0:1, thus lowering peak load in the electrical distribution system. This reduction in peak current draw increases the number of loads which can be connected in the electrical power system.

As previously described, the third harmonic currents from all three phases are additive in the neutral wire of a three phase Wye-connected power system. The reduction of the third harmonic neutral current effected by using the present invention to reduce third harmonic currents in each phase results in lower currents in the neutral wire.

By reducing the RMS current in each phase wire while not affecting the fundamental current drawn by the nonlinear load in each phase line, the present invention improves the power factor (the ratio of fundamental current to RMS current) for the electrical distribution system. In the example shown, the power factor is improved from 0.71 to 0.93.

The operation of nonlinear loads at reduced AC source voltages is hampered by the need to draw high peak currents. At reduced voltages the peak current cannot be supplied and the load fails to operate. By decreasing the peak current drawn by nonlinear loads as shown and described above, the present invention permits operation at reduced source voltages. By way of one example, a nonlinear load which is adapted to operate at 120 v is substantially fully operational at 70 v upon connection to the present invention in an electrical system.

Figures 6, 10:
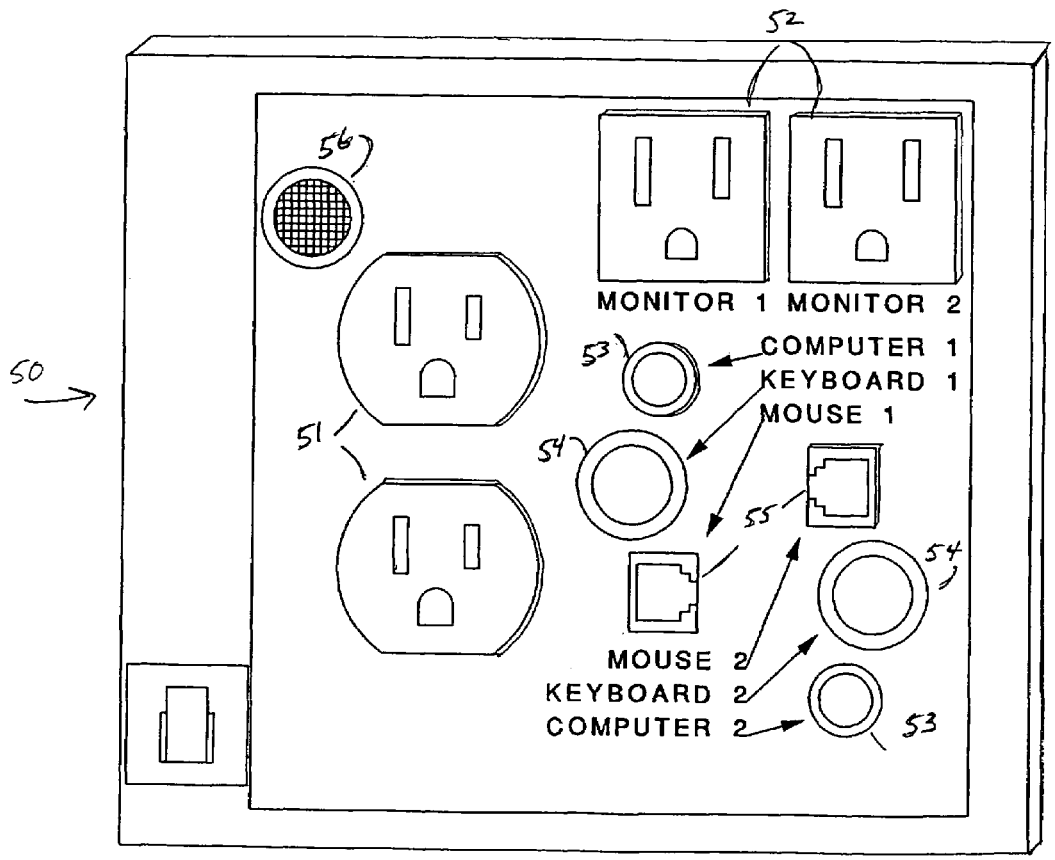
FIG. 6 is a table comparing the current drawn by nonlinear loads in a three phase electrical power system without the present invention connected therein to the current drawn in such a system having embodiments of the invention connected to each phase line therein.
FIG. 10 is a front elevational view of a preferred embodiment of the present invention having a monitor saving feature.

The results of the present invention in a three-phase Wye-connected electrical distribution system is shown in FIG. 6. The nonlinear loads in the measurement are three different PC computers, one connected to a separate phase line and sharing a common neutral wire. The harmonic current and RMS currents for each phase line are reduced when the present invention is connected in each. Likewise, the third harmonic current in the neutral wire is reduced, from 736.7% of the fundamental current to 114% of the fundamental current. Further, the RMS current in the neutral wire is reduced from 3.06 amps to 0.8 amps, realizing a 73.9% drop in neutral current.

Since the present invention substantially eliminates neutral currents in the multiple phase electrical distribution systems by reducing harmonic currents in the phase lines into which the present invention is connected, only small phase currents remain in the neutral line. This reduction results in the elimination of techniques used to compensate for large neutral currents, such as oversizing the neutral line, having separate neutral lines for each phase line or oversizing transformers to handle extra neutral currents.

Figure 2:
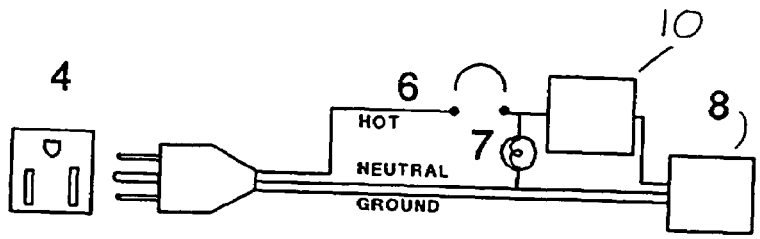
FIG. 2 is a block diagram showing a preferred embodiment of the present invention connected within an electrical power system.
Figure 3:
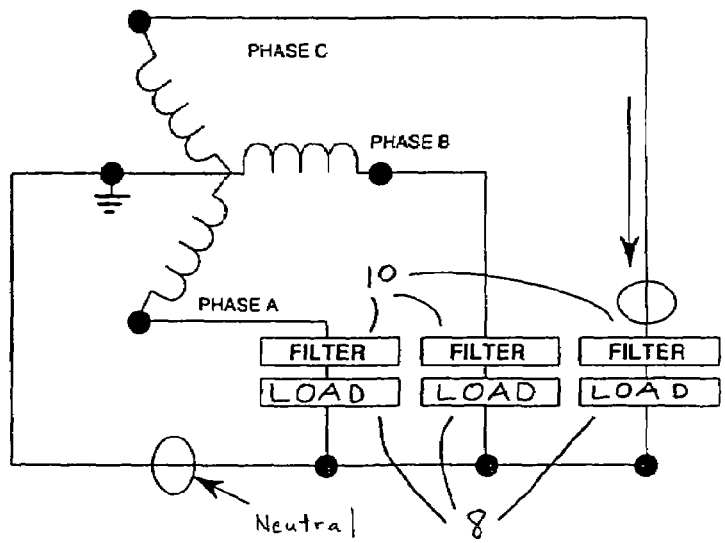
FIG. 3 is a schematic block diagram showing the preferred embodiment of the present invention connected within a three phase Wye-connected electrical power system.

The present invention in the preferred embodiment as shown in FIGS. 2 and 3 is added to an electrical distribution system by simply connecting the invention 10 with a plug between the AC source 4, such as a wall outlet, and the desired nonlinear load(s) 8. A preferred embodiment of the present invention optionally includes a series connected circuit breaker 6 (FIG. 2) to protect the circuitry from excessive current by breaking the connection between the AC source and the nonlinear load upon detection thereof. A pilot light 56 (FIGS. 10, 11 and 12) is preferably but not necessarily included which provides an indication that the circuit is powered and therefore functional.

The present invention is adapted for operation in power systems having any nonlinear loads, which include but are not necessarily limited to computer power systems or lighting systems with solid-state ballasts. The present invention is further adapted for use in a wide range of operations, for example in systems having 6, 15, or 20 amp or higher current nonlinear loads.

Further, the present invention consumes negligible power due to the fact that the device alters the way in which the nonlinear load draws current, instead of generating additional currents resembling harmonic currents which already exist in the system.

Figure 11:
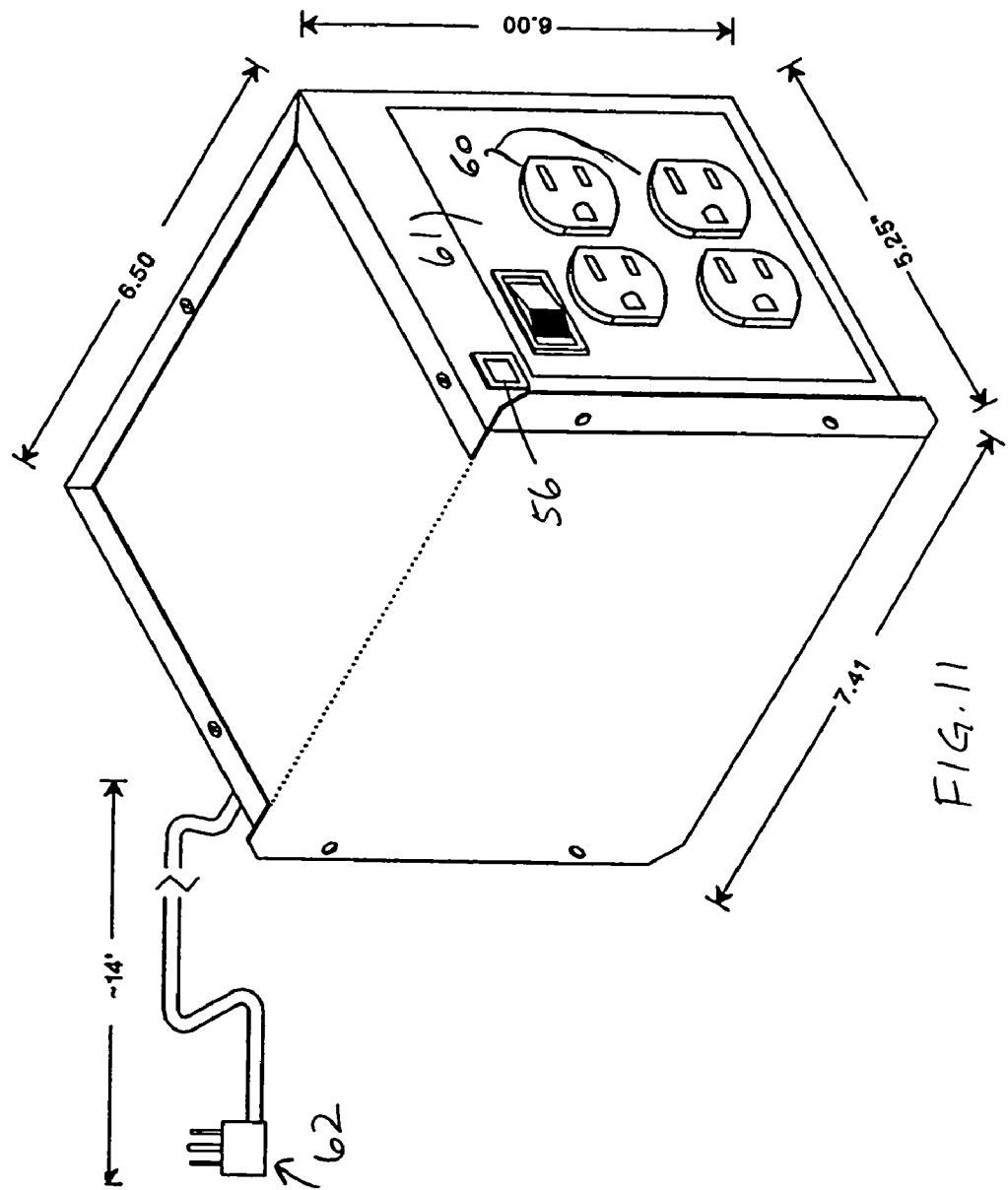
FIG. 11 is a perspective view of preferred embodiment of the present invention.
Figure 12:
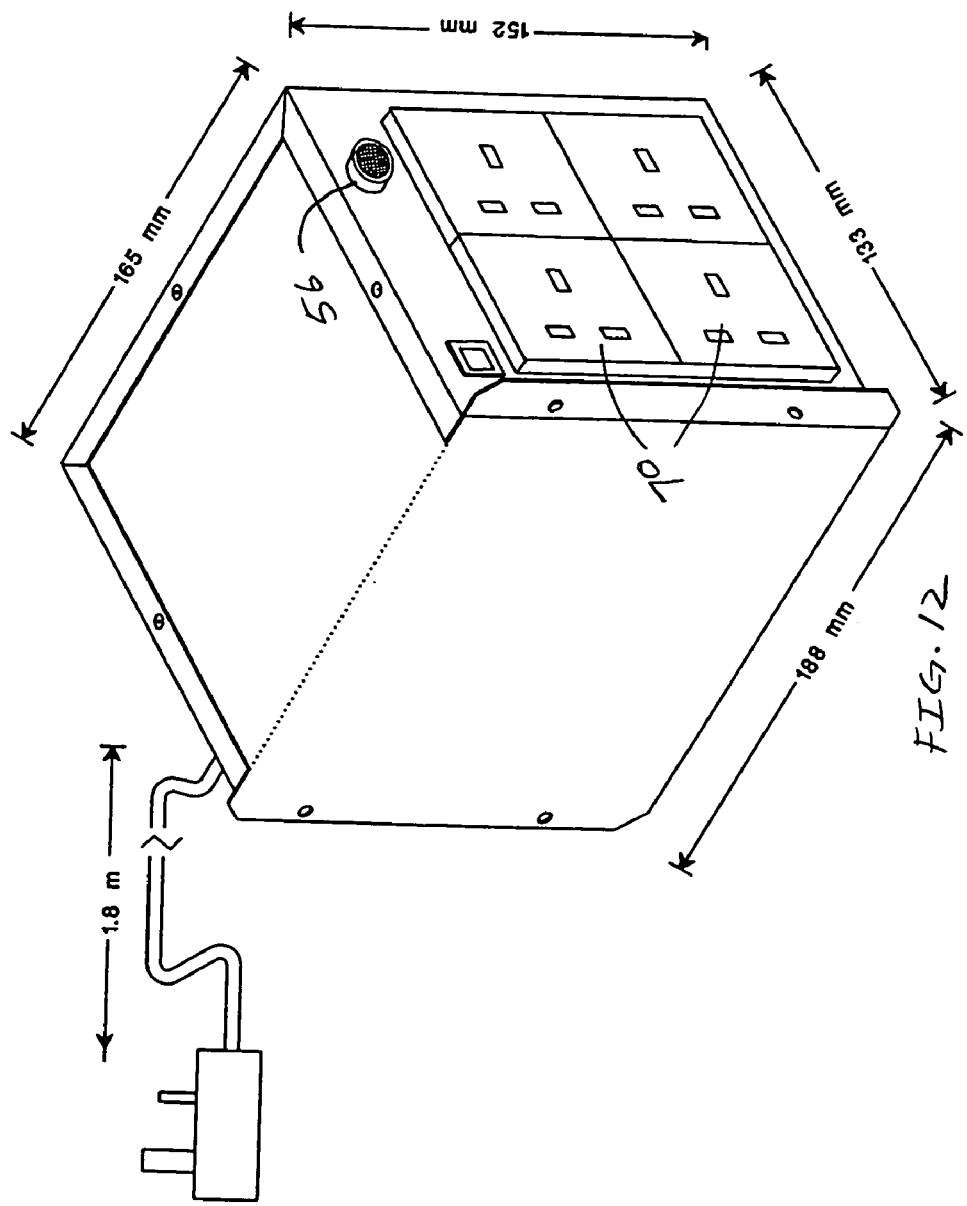
FIG. 12 is a perspective view of a preferred embodiment of the present invention being adapted for foreign usage.

In use, the device is easily installed into a power system by connecting the AC source to the device, such as by plugging cord 62 (FIG. 11) into an AC outlet, and plugging the nonlinear loads into the electrical sockets of the present invention (sockets 60 of FIG. 11).

Although there have been described what is at present considered to be the preferred embodiment of the present invention, it will be understood that the invention can be embodied in other specific forms without departing from the spirit or essential characteristics thereof.

For example, the device may be designed for installation in an electronics equipment rack. As shown in FIG. 7, device 10 comprises jacks 30 for connection to the nonlinear loads; and rack panel 31, which includes rack connecting slots 32 and a substantially perforated portion 3 so as to allow airflow therethrough. In this way, the device can replace a cooling panel so as to improve system performance without sacrificing airflow or extra rack space.

In addition, device 10 may be mounted to a floor or wall so as to replace a conventional electrical outlet box and is directly wired into the building electrical system. Referring to FIGS. 8 and 9, device 10 preferably but not necessarily includes mounting plates 41, a face plate 40 (best seen in FIG. 11), and connectors 42 to the phase and neutral lines leading to the AC source.

Figure 15:
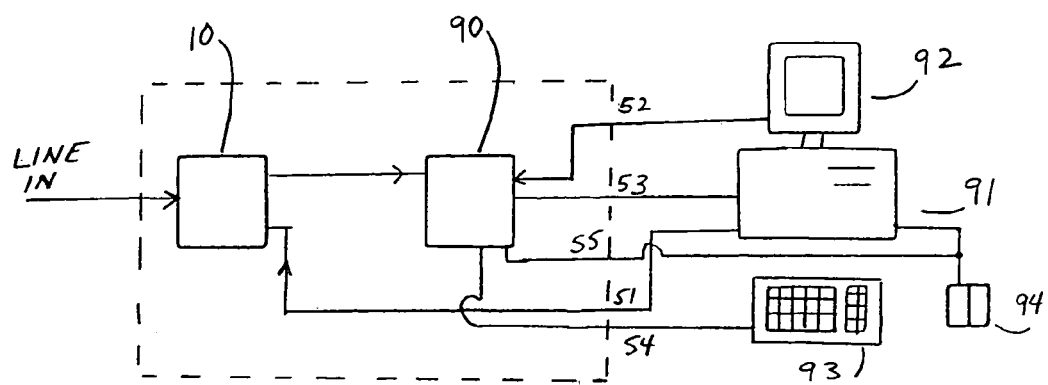

Further, device 10 preferably includes at least one computer monitor saver boards. Computer monitors typically consume the most energy of a computer. In an effort to conserve power in a computer system, monitor saver devices were created to effectively temporarily deactivate the monitor display following a period of keyboard or mouse inactivity until a subsequent keyboard or mouse command is entered, thereby saving energy and extending the monitor's life. Because not all computers include circuitry to perform this operation, one alternative embodiment of the present invention includes a monitor saver board adapted to connect between two computer monitors and their corresponding computers, keyboards, and mouses. As shown in FIG. 10, this alternative embodiment includes face plate 50 having electrical sockets 51 for connecting to each computer power cord, connectors 52 for connection to each monitor, connectors 53 for connection to each computer, connectors 54 for connection to each keyboard, and connectors 55 for connecting to each mouse. Referring to FIG. 15, there is shown harmonic current eliminating device 10 connected in series to screen saver board 90, which is itself connected to monitor 92, keyboard 93, mouse 94, and computer 91.

Figure 14:
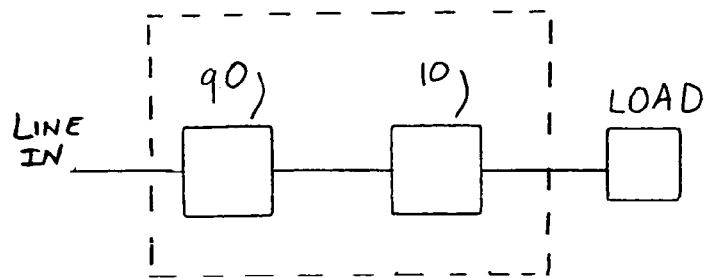
FIG. 14 is a block diagram of another preferred embodiment of the present invention.

Another preferred embodiment includes at least one hospital grade isolation transformer 90, such as a UL544 certified transformer for critical patient use, connected to device 10 so as to provide a device which substantially eliminates the adverse effects of harmonic currents in hospital patient equipment, as shown in FIG. 14. The device preferably but not necessarily attaches to a hospital patient utility cart and connects to the electronic equipment thereon.

Still another preferred embodiment is adapted for foreign use by including at least one electrical socket which is compatible with a foreign electrical system, and tuning device 10 to a harmonic of the fundamental frequency thereof, such as 50 Hz.

An alternative embodiment may preferably but not necessarily include circuitry for controlling the current drawn by electronic equipment such as laser printers or copying machines which not only include a nonlinear loading section for a phase line, but also a large heating unit. The heating units are activated several times per minute and draw sizeable current levels during activation. By way of one example, a heating unit may draw a peak current of 25–30 amps. This peak current draw significantly limits the number of printing machines which can be connected to a line and may also cause voltage drops in the line voltage, thereby affecting computers or other devices connected on the supply line.

Figure 13:
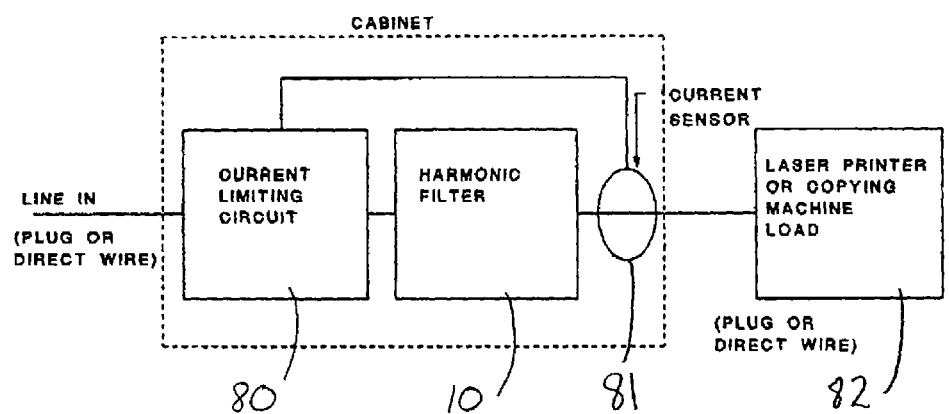
FIG. 13 is a block diagram of a preferred embodiment of the present invention.

As shown in FIG. 13, the alternative embodiment includes high current limiting circuit 80, which is connected to harmonic current eliminating device 10; current sensor 81, which detects high peak current levels drawn from printing/copying machine 82 and activates high current limiter 80 in response to such high current detection. When printing machine 82 is no longer drawing high peak currents (i.e., when the heating unit therein is sufficiently heated), current sensor 81 signals to high current limiting circuit 80 to be substantially automatically switched out of or isolated from the system. The switching does not affect the operation of the printing/copying device.

Specifically, high current limiting circuit 80 preferably clamps the current drawn by printing machine 82 to a level substantially less than the typical peak current levels, such as between 6 and 8 amps. Current sensor 81 preferably but not necessarily detects a substantially rapid increase in current drawn by printing/copying machine 82. Device 10 substantially eliminates the harmonic currents drawn by machine 82 and substantially eliminates neutral currents in the system, as explained above.

The described embodiments are, therefore, to be considered in all aspects as illustrative, and not restrictive. The scope of the invention is indicated by the appended claims rather than the foregoing description.

The invention claimed is:

1. A device for reducing currents in an electrical system which supplies power to a nonlinear load from an AC source, comprising:
   a first passive electrical component connected in series with the nonlinear load;
   a second passive electrical component connected in parallel to said first passive electrical component;
   a third passive electrical component connected in parallel to said first and said second passive electrical components;
   said first, second and third passive electrical components are tuned to a third harmonic frequency of the AC source so as to substantially alter current drawn by the nonlinear load;
   a housing member for said first, second and third passive electrical components;
   means for connecting the nonlinear load to said parallel connection of said first, second and third passive electrical components;
   said connecting means includes an equipment rack panel member connected to said housing so as to mount said housing in an equipment rack storing the nonlinear load; and
   said equipment rack panel member is substantially perforated so as to allow airflow to pass therethrough.

2. A device according to claim 1, wherein:
   the nonlinear load comprises a computer having a monitor connected thereto.

3. A device according to claim 2, wherein:
   said housing member includes electrical connectors for connection to said monitor and said computer.

4. A device for reducing currents in an electrical system which supplies power to a nonlinear load from an AC source, comprising:
   a first passive electrical component connected in series with the nonlinear load;
   a second passive electrical component connected in parallel to said first passive electrical component;
   a third passive electrical component connected in parallel to said first and said second passive electrical components;
   said first, second and third passive electrical components are tuned to a third harmonic frequency of the AC source so as to substantially alter current drawn by the nonlinear load;
   a housing member for said first, second and third passive electrical components;
   first means for connecting the nonlinear load to said parallel connection of said first, second and third passive electrical components;
   second means, connected in series with said parallel connection of said first, second and third passive electrical components, for controlling current levels drawn by the nonlinear load; and
   said second means comprising a current limiting circuit, a circuit for detecting a rapid rise in current drawn by the nonlinear load, and a switch for automatically deactivating said current limiting circuit based upon signal levels detected by said current detecting circuit.

5. A device according to claim 4, wherein:
   said current limiting circuit maintains a maximum current level drawn by the nonlinear load to between approximately 6 and 8 amps.

* * * * *